United States Patent [19]
Butcher

[11] 3,950,990
[45] Apr. 20, 1976

[54] BULK FLOW METER

[75] Inventor: Alan George Butcher, Bracknall, England

[73] Assignee: Dresser Europe, S.A., Brussels, Belgium

[22] Filed: Sept. 30, 1974

[21] Appl. No.: 510,865

[30] Foreign Application Priority Data
Oct. 3, 1973  United Kingdom............... 46262/73

[52] U.S. Cl..................................... 73/253; 73/3; 73/233; 73/261
[51] Int. Cl.² .......................................... G01F 3/08
[58] Field of Search ............ 73/253, 257, 259, 261, 73/272, 233, 3; 418/169, 170, 191, 104

[56] References Cited
UNITED STATES PATENTS

| | | | |
|---|---|---|---|
| 1,190,705 | 7/1916 | Bassett | 73/272 R X |
| 3,301,054 | 1/1967 | Ebert | 73/233 |
| 3,482,446 | 12/1969 | Wrinkle et al. | 73/257 |
| 3,554,032 | 1/1971 | Schneider, Jr. | 73/257 |
| 3,842,672 | 10/1974 | Schneider, Jr. | 73/253 |

FOREIGN PATENTS OR APPLICATIONS
576,644  4/1946  United Kingdom.................. 73/233

Primary Examiner—Richard C. Queisser
Assistant Examiner—John P. Beauchamp
Attorney, Agent, or Firm—Wenderoth, Lind & Ponack

[57] ABSTRACT

A liquid flow meter of a rotary positive-displacement kind comprising a rotor and an idler mounted in a housing having an inlet and an outlet port. The rotor has blades which are swept around the housing by the fluid and the idler has pockets within which the rotor blades are returned from outlet to inlet in a fluid seal. There are four blades and three pockets, the idler being geared to the rotor so that the idler rotates four revolutions for every three revolutions of the rotor. With this arrangement the blades twist very little while in the pockets and turbulence and drag is consequently reduced, leading to greater accuracy.

10 Claims, 7 Drawing Figures

BULK FLOW METER

The invention relates to a liquid flow meter of a rotary positive-displacement kind. Such meters have many applications and a principal application for the present meter is in the measurement of bulk liquid fuel flow in, for example, the loading and unloading of liquid fuel tankers.

The invention is particularly concerned with a liquid flow meter of the kind comprising a housing defining an annular cylindrical chamber having inlet and outlet ports; a rotor comprising an annular plate portion from which depend a number of blades which fit the annular chamber in sealing relationship so that fluid passing from the inlet to outlet around the chamber drives the rotor by way of the blades; and an idler geared to rotate with the rotor about an axis parallel with and offset from the rotor axis, the idler being basically cylindrical with longitudinal pockets formed in its sides, the pockets each accommodating a rotor blade as the blade returns from the outlet to the inlet and the pocket giving a liquid seal for the rotor blade, the idler running in sealing relationship with a portion of the housing wall. The above defined meter will hereinafter be called the liquid flow meter of the kind referred to. The present invention seeks to provide an improved meter of the kind referred to.

According to one aspect of the present invention the diameter of the idler is greater than half the diameter of the rotor, the rotor has four blades, the idler has three pockets and the gearing is such that the idler rotates four revolutions for every three revolutions of the rotor.

It has been proposed to use an idler with only two pockets. However, the use of a larger number of pockets allows a construction in which the rotor blades twist less relatively to the pockets and thereby cause less turbulence in the liquid within the pockets. This reduces drag on the rotor and therefore reduces errors which would be caused by an increased pressure drop and leaks owing to the drag.

Other features of the invention provide for ease of machining and assembly of the meter. Thus, according to a preferred aspect of the invention the plate portion of the rotor is provided with upstanding pads which are machined to constitute a sliding seal with the cooperating faces of the idler. By recognising that not all of the surface area of the plate portion between the blades is used for sealing a difficult machining operation hitherto thought necessary is avoided, since it is not necessary to machine the plate portion flat over the whole region between the blades.

In accordance with another aspect of the invention the floor of the annular cylindrical chamber is raised over the portion where it seals with the blades as compared with the portion where it seals with the idler. This allows the blades of the rotor to be shorter than the idler so giving a small clearance beneath the blades in the region where the idler seals with the floor of the chamber. At this time it is not necessary for the blades to seal with the floor of the chamber and this arrangement allows a freedom of tolerances in manufacture compared with an arrangement in which the blades seal with the floor of the chamber around its whole circumference.

Generally, the inlet and outlet ports of a meter of the kind referred to are parallel. However, it is sometimes desired to place the meter in a straight-line conduit, in which case it is possible to insert right-angle unions at the inlet and outlet ports. However, it is found that this may give rise to turbulence at the inlet port owing to incoming fluid tending to cross the inlet port and impinge on the idler with some force. A feature of the invention which has been found to reduce the inaccuracies due to such turbulence is to provide a deflecting vane in the inlet port in such an arrangement. The deflecting vane may be constructed in two parts, one being mounted in the port proper to align with the desired incoming flow direction whether there is a right-angle union or not, and the other part being mounted in the right-angle union so that when mounted it lines up with the first-mentioned part.

In order to adjust for the effects of manufacturing tolerances it is necessary to provide an infinitely variable output gear as a calibrator in the output drive from the meter. This may comprise a direct gear which drives one input of a differential gear from the output of the rotor spindle. In addition, there may be provided a disc-and-wheel infinitely variable gear which is driven by the rotor spindle and which, in dependence on its adjustment, adds another input to the differential gear of an appropriate magnitude to give a desired number of revolutions per unit fuel flow.

In accordance with another aspect of the present invention such a calibrator is arranged so that the wheel and disc drive reduces the overall output speed instead of adding to it. This has the advantage of allowing a greater torque load to be transmitted by the calibrating mechanism.

It is commonly desirable to be able to change the output reading of the meter from gallons to liters. This generally involves changing a set of output gears between the meter drive and the indicating drum. Hitherto, it has been necessary to provide a different set of gears for each required volume measurement. Another aspect of the present invention provides that the meter drives the indicator drum through a pair of gears on parallel shafts, the gearing being such that simply by changing the two gears over on the shafts the indicated output is changed from gallons to liters or vice versa.

The invention will further be described with reference to the accompanying drawings, of which:

Figure 1:
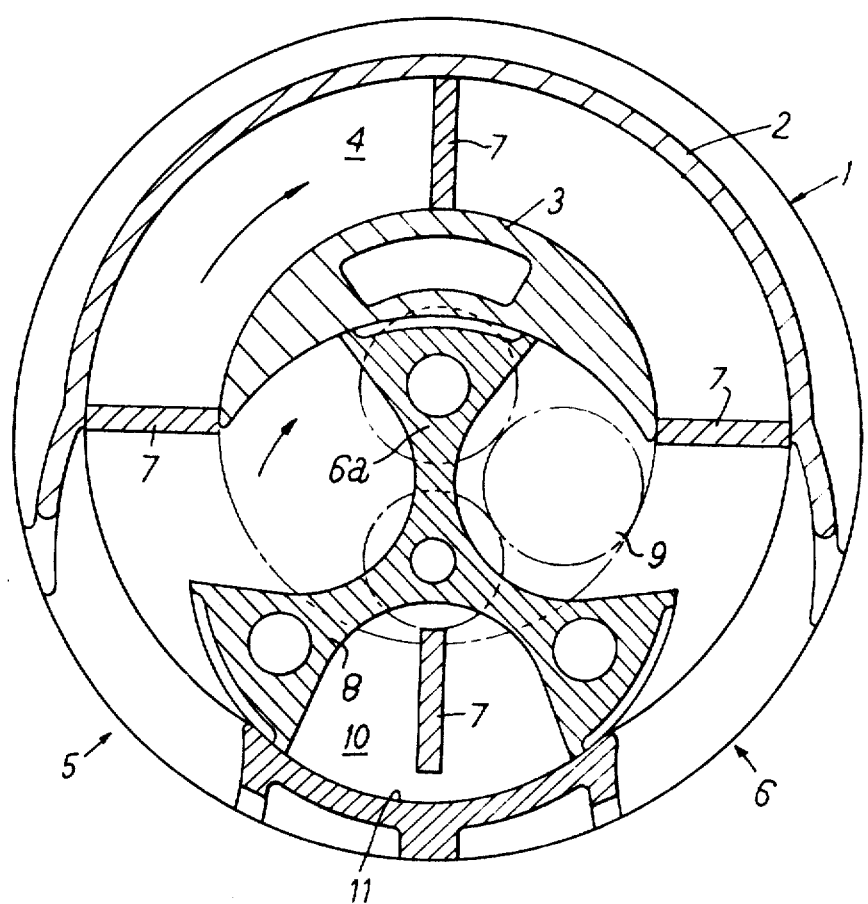
FIG. 1 is a schematic plan view of a meter in accordance with the invention.

Referring to FIG. 1 the meter comprises a cylindrical casing 1 which has an outer wall 2 and a central cylinder 3 between which is defined an annular chamber 4 coupling an inlet port 5 to an outlet port 6. A rotor is mounted to rotate about the axis 6a of the housing and has four blades 7 depending therefrom. The blades fit the chamber 4 in sealing relationship over the upper semi-circular region in the drawing.

An idler 8 is geared by means of intermeshing gears 9 to rotate with the rotor. The idler is greater in diameter than half the diameter of the rotor and has three pockets 10 in its walls. The gearing 9 is such that the idler rotates four revolutions for every three revolutions of the rotor. The disposition of the pockets 10 is such that in rotating past a sealing surface 11, with which the idler seals, a blade 7 is accommodated in each pocket. The blades are thus returned from the outlet to the inlet of the meter in a liquid seal. In the drawing, the arrows show the direction of flow of fluid and of rotation of the idler of the rotor.

Figure 2:
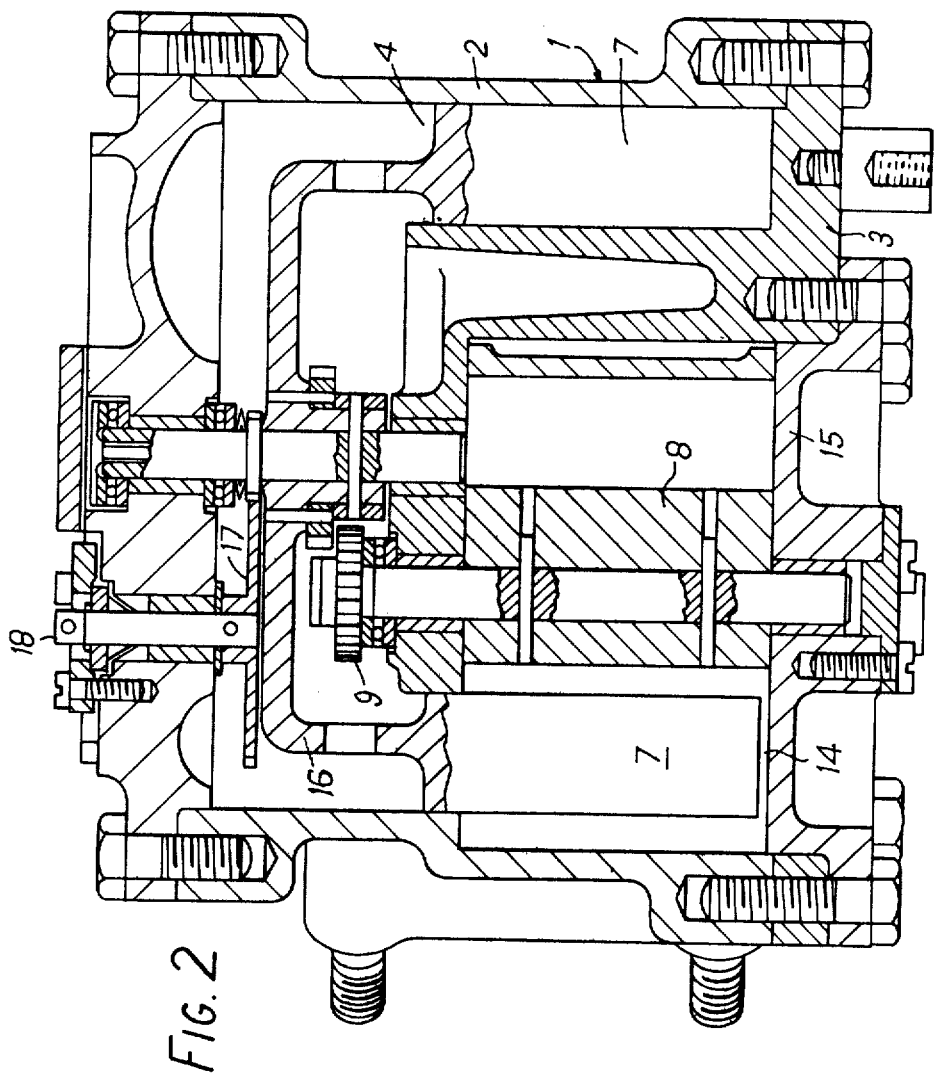
FIG. 2 is a cross-sectional elevation of the meter of FIG. 1.

Referring now to FIG. 2 the meter is shown in sectional side elevation and it will be seen that on the right-hand side the blades 7 form a close sliding seal with the walls and the floor of the chamber 4. The upper part of the chamber is sealed by an annular plate portion integral with the rotor. This portion is shown at 11a in FIG. 3.

The forward region for the blades is the semi-circular region in the upper part of FIG. 1 and at the right-hand side of FIG. 2. The return region is the region adjacent the portion 10. Over the forward region, the floor of the chamber 4 is raised with respect to the floor at the return region. This can be seen from FIG. 2, where there is a clearance 14 between the tip of blade 7 and the floor of chamber 4. The idler seals against the floor of the chamber at the return region and it will be seen that the rotor blades are therefore shorter than the idler in this respect. This means that extremely close tolerances in machining of the blades in relation to the idler need not be maintained. The sequence of machining is important. Firstly, the bore of the housing is machined circular and the block 15 which fits its base is machined and placed concentrically to locate within the housing. The second boring operation to house the idler is then carried out and this again is a completely circular machining operation. The basic construction allows withdrawal of the idler from the bottom of the meter and withdrawal of the rotor from the top, completely independently.

It will be seen that the gears 9 are housed in a dome portion 16 of the rotor. Output gearing 17 is coupled to the rotor shaft to drive an output shaft 18.

Figure 3:
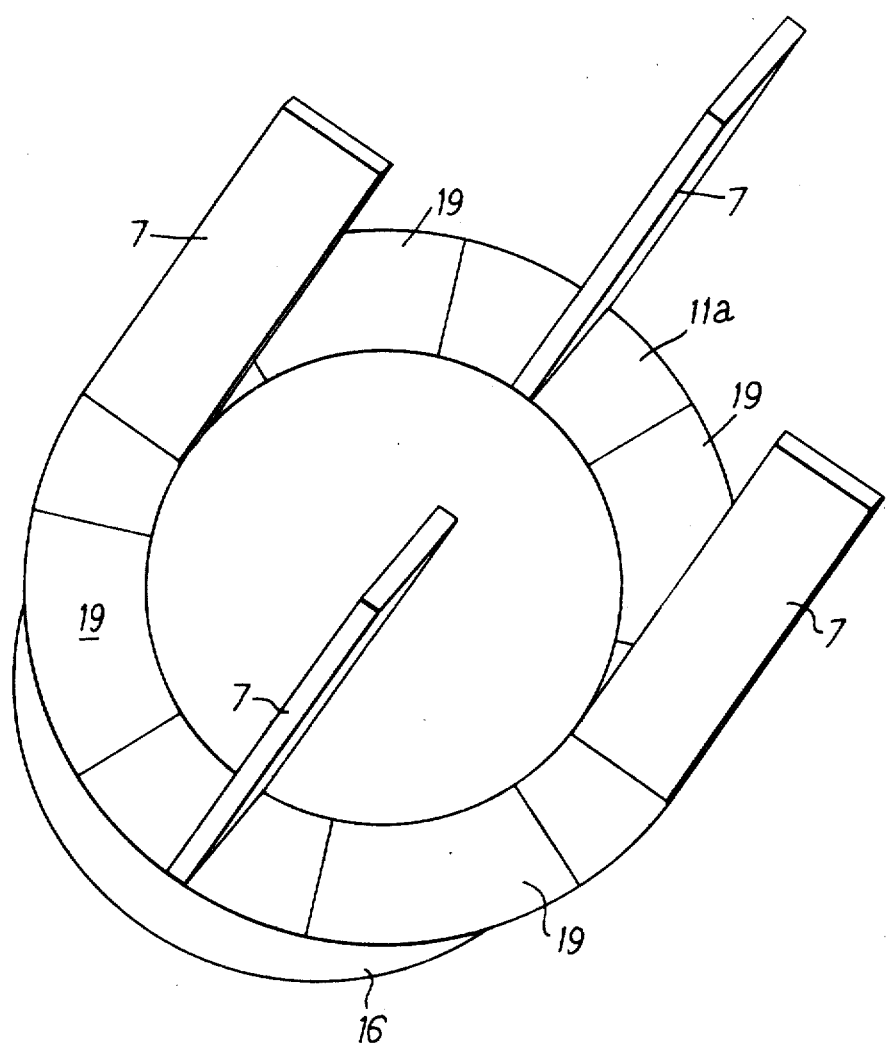
FIG. 3 is a perspective view of part of the rotor of the meter of FIGS. 1 and 2.

FIG. 3 shows the rotor and in particular it is to be observed that the bottom face of the annular plate portion 11 is not machined uniformly but has raised pads 19 between the blades. These pads are upstanding and seal with the upper face of the idler, it being unnecessary to machine the plate portion uniformly over the entire region between the blades 7.

Figure 4:
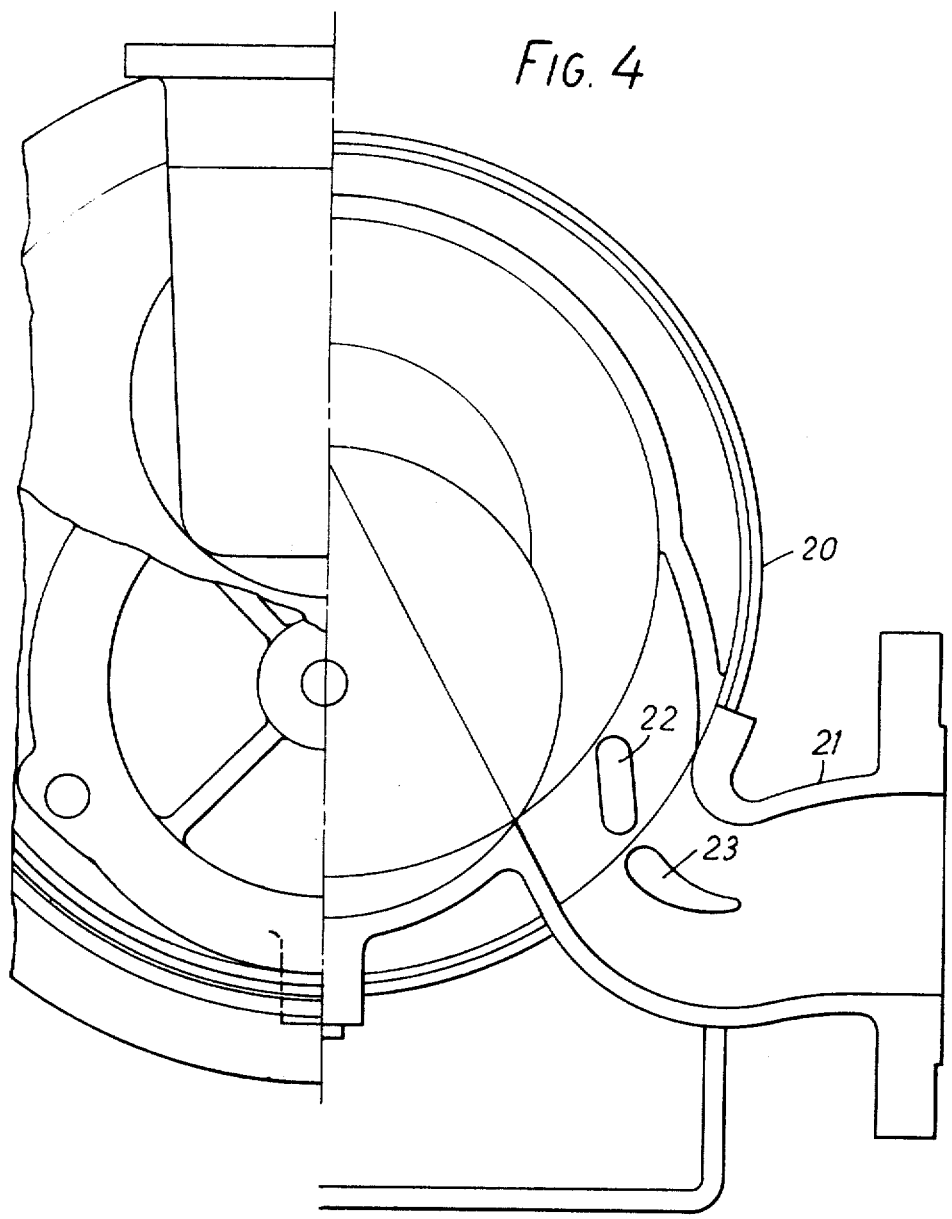
FIG. 4 is a view of a meter embodying another aspect of the invention.

Referring now to FIG. 4 there is shown a meter of the kind shown in FIGS. 1 and 2 which further has a steel pressure casing 20 surrounding the housing 1. The housing 1 is formed of cast-iron which is sometimes not acceptable for high pressure volatile liquids. The outer casing 20 is filled with the pressurised liquid and relieves the pressure differential from the wall of housing 1.

FIG. 4 shows the configuration of the inlet port where it is desired to place the meter in line in a straight conduit rather than use the inlet and outlet ports as parallel ports as shown in FIG. 1. For straight-line application right-angled unions are applied to the ports, one of which is shown at 21 in FIG. 4. A difficulty with this arrangement is that high velocity fluid flowing down the conduit tends to cross the mouth of the inlet port and impinge with undue velocity on the idler. This causes turbulence with consequent drag and loss of accuracy. In order to alleviate this difficulty the inlet port is provided with a deflector vane. As seen in FIG. 4 the deflector vane is made in two parts, shown at 22 and 23. Part 22 is in the casing of the meter whereas part 23 is in the right-angled union. The vanes combine to direct the fluid flow in the desired direction.

Figure 5:
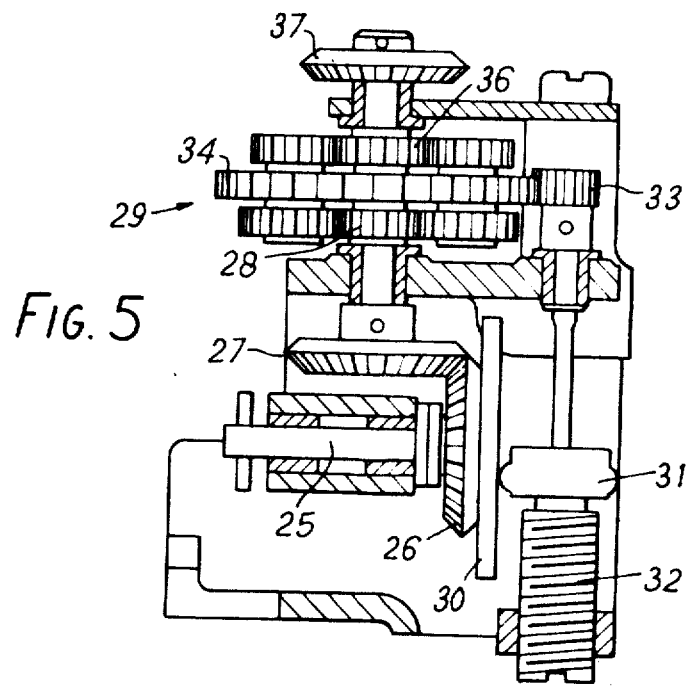
FIG. 5 is a cross-sectional elevation of the calibrator of the meter of FIGS. 1 and 2.

Referring now to FIG. 5 there is shown a calibrator mechanism for fine adjustment of the output of the meter. An input shaft 25 of the calibrator is coupled to shaft 18 of the meter (FIG. 2). Shaft 25 drives bevel gears 26 and 27 and gear 27 is coupled to drive an input sun gear 28 of a differential 29. A disc 30 is fixed to gear 26 and drives a friction wheel 31 which is slideable by screw adjustment of a screw 32. Wheel 31 drives a gear 33 which is coupled to the cage gear 34 of the differential 29. Wheel 34 carries the planet gears 35 and assists in driving the output sun gear 36 of the differential. This gives the final drive via a bevel gear 37.

The basic drive for the output from the meter is thus given by shaft 25 through the differential to gear 37. However, an adjustable increment is subtracted from this drive by means of the friction wheel 31 and the differential 29. The component subtracted is adjustable by manipulation of screw 32 so as to give an accurate output. It is to be noted that the contribution of friction wheel 31 is a decrement rather than an increment and this has the advantage of allowing a greater torque load to be transmitted by the calibrating mechanism, single the torque reaction created by the counter and accessories being driven by the calibrator tends to assist rather than oppose the operation of the wheel and disc mechanism.

Figure 7:
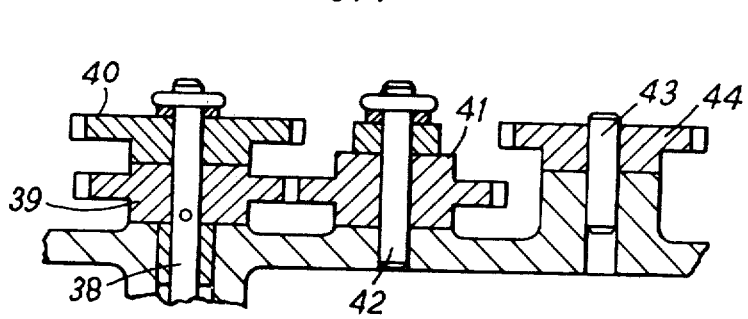
FIG. 7 is a cross-sectional view taken at G—G of FIG. 6.
Figure 6:
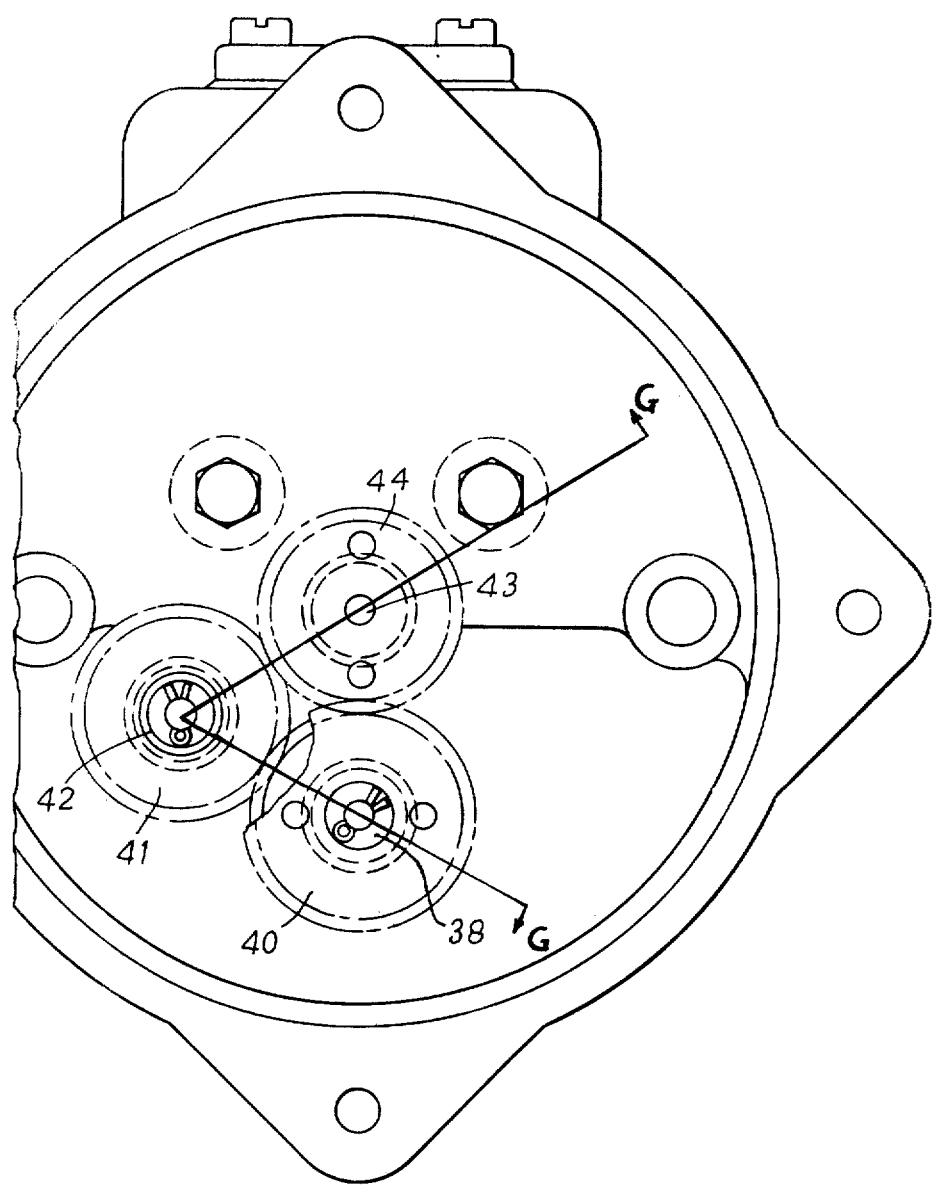
FIG. 6 is a plan view of the output gearing of the meter.

Referring to FIG. 6 there is shown in plan view the output gear arrangement for the meter. FIG. 7 is a section taken at G—G of FIG. 6. Shaft 38 is driven by bevel gear 37 of FIG. 5. Shaft 38 carries two gears 39 and 40. Gear 39 meshes permanently with an idler gear 41 of the same diameter on a shaft 42. The output shaft is shown at 43 and carries a gear 44. If forward movement of the meter with respect to shaft 38 is required then gear 40 meshes directly with gear 44. The output of the meter and the ratio of the gears 40 and 44 are chosen such that with the larger gear 40 on the input shaft the output shaft 43 is driven to indicate liters. Furthermore, the arrangement is such that by simply changing over gears 44 and 40 on shafts 43 and 38 the mesh to drive shaft 43 is in terms of gallons instead of liters. If reverse motion is required gears 40 and 44 are placed on shafts 42 and 43 instead of shaft 38 and 43. Again the gears mesh and can be interchanged to give liters of gallons as required.

I claim:

1. A liquid flow meter comprising a housing having inner and outer cylindrical walls defining an annular cylindrical chamber, the outer cylindrical wall of the housing having therein an inlet port and an outlet port spaced around the chamber from the inlet port, a rotor comprising an annular plate portion and a plurality of blades which depend from the plate portion and which fit the annular chamber in sealing relationship so that fluid passing along a forward path from the inlet port of the outlet port around the chamber drives the rotor by way of the blades, an idler between the outlet port and the inlet port, and gearing coupling the idler to the rotor to rotate therewith about an axis parallel with and offset from the rotor axis, the idler being basically cylindrical and having longitudinal pockets in its sides, the pockets each accommodating a rotor blade as the blade returns from the outlet port to the inlet port and the pocket providing a liquid seal for the rotor blade, the idler running in sealing relationship with the portion of the housing wall lying along the return path between the inlet and outlet ports, the diameter of the idler being greater than half the diameter of the rotor, the rotor having more blades than the idler has pockets, the plate portion of the rotor, being provided with upstanding pads which are machined and are in sliding sealing contact with the cooperating faces of the idler as the pockets in the idler move along the return path with a rotor blade accommodated therein, and the gearing rotating the idler faster than the rotor and the synchronization between the rotor and the idler being maintained to maintain sealing between the pads and the cooperating faces of the idler.

2. A liquid flow meter comprising a housing having inner and outer cylindrical walls defining an annular cylindrical chamber, the outer cylindrical wall of the housing having therein an inlet port and an outlet port spaced around the chamber from the inlet port, a rotor comprising an annular plate portion and a plurality of blades which depend from the plate portion and which fit the annular chamber in sealing relationship so that fluid passing along a forward path from the inlet port to the outlet port around the chamber drives the rotor by way of the blades, an idler between the outlet port and the inlet port, and gearing coupling the idler to the rotor to rotate therewith about an axis parallel with and offset from the rotor axis, the idler being basically cylindrical and having longitudinal pockets in its sides, the pockets each accommodating a rotor blade as the blade returns from the outlet port to the inlet port and the pocket providing a liquid seal for the rotor blade, the idler running in sealing relationship with the portion of the housing wall lying along the return path between the inlet and outlet ports, the floor of the annular cylindrical chamber being higher along the portion where it seals with the blades as compared with the portion where it seals with the idler, and the gearing rotating the idler faster than the rotor and synchronization between the rotor and the idler being maintained.

3. A liquid flow meter as claimed in claim 1, wherein the inlet and outlet ports are in line and wherein right-angle unions are connected thereto at the ports to direct the flow into and out of the meter, the inlet portion being provided with a deflecting vane to reduce turbulence.

4. A liquid flow meter as claimed in claim 3, wherein the deflecting vane is in two parts, one part being mounted in the input port to align with the desired incoming flow direction and the other part being mounted in the rightangle union so that it lines up with the first mentioned part.

5. A liquid flow meter comprising a housing having inner and outer cylindrical walls defining an annular cylindrical chamber, the outer cylindrical wall of the housing having therein an inlet port and an outlet port spaced around the chamber from the inlet port, a rotor comprising an annular plate portion and a plurality of blades which depend from the plate portion which fit the annular chamber in sealing relationship so that fluid passing along a forward path from the inlet port to the outlet port around the chamber drives the rotor by way of the blades, an idler between the outlet port and the inlet port, and gearing coupling the idler to the rotor to rotate therewith about an axis parallel with and offset from the rotor axis, the idler being basically cylindrical and having longitudinal pockets in its sides, the pockets each accommodating a rotor blade as the blade returns from the outlet port to the inlet port and the pocket providing a liquid seal for the rotor blade, the idler running in sealing relationship with the portion of the housing wall lying along the return path between the inlet and outlet ports, an output drive and a calibrator in the output drive, the calibrator comprising a differential gear having one input, a direct gear meshed with one input and coupled to said rotor and driven thereby, and there being provided an infinitely adjustable disc and wheel gear coupled to and driven by the rotor and in turn coupled to and driving said differential gear, whereby adjustment of said disc and wheel gear enables the output of the calibrator to give an appropriate number of revolutions per unit flow of liquid.

6. A liquid flow meter as claimed in claim 1 wherein the inlet and outlet ports are in line and wherein right-angle unions are connected thereto at the ports to direct the flow into and out of the meter, the inlet port being provided with a deflecting vane to reduce turbulence.

7. A liquid flow meter as claimed in claim 6 wherein the deflecting vane is in two parts, one part being mounted in the input port to align with the desired incoming flow direction and the other part being mounted in the right-angle union so that it lines up with the first mentioned part.

8. A liquid flow meter as claimed in claim 5 wherein the wheel and disc gear acts to reduce the output speed of the calibrator.

9. A liquid flow meter as claimed in claim 5 wherein the diameter of the idler is greater than half the diameter of the rotor, the rotor has four blades the idler has three pockets, and the gearing is such that the idler rotates four revolutions for every three revolutions of the rotor.

10. A liquid flow meter as claimed in claim 1 the meter having an indicator drum and a pair of gears on parallel shafts which drive the indicator drum, one of the gears being coupled to and being driven by the rotor, the ratio of the gears being such that, by changing the two gears between the shafts, the indicated output is changed from gallons to liters and vice versa.

* * * * *